United States Patent [19]
Berson et al.

[11] Patent Number: 5,742,685
[45] Date of Patent: Apr. 21, 1998

[54] METHOD FOR VERIFYING AN IDENTIFICATION CARD AND RECORDING VERIFICATION OF SAME

[75] Inventors: William Berson, Weston, Conn.; Shailendra Kumar, San Diego, Calif.

[73] Assignee: Pitney Bowes Inc., Stamford, Conn.

[21] Appl. No.: 541,171

[22] Filed: Oct. 11, 1995

[51] Int. Cl.$^6$ .................................................. H04L 9/00
[52] U.S. Cl. ............................................................ 380/25
[58] Field of Search .................... 380/23, 25; 340/825.34

[56] References Cited

U.S. PATENT DOCUMENTS

| | | | |
|---|---|---|---|
| 4,864,108 | 9/1989 | Hamada et al. | 235/30 |
| 4,993,068 | 2/1991 | Piosenka et al. | 380/23 |
| 4,995,081 | 2/1991 | Leighton et al. | 380/23 |
| 4,998,279 | 3/1991 | Weiss | 380/23 |
| 5,095,196 | 3/1992 | Miyata et al. | 235/382 |
| 5,131,038 | 7/1992 | Pohl et al. | 380/23 |
| 5,159,635 | 10/1992 | Wang | 380/51 |
| 5,195,133 | 3/1993 | Kapp et al. | 380/9 |
| 5,229,764 | 7/1993 | Matchett et al. | 340/825.34 |
| 5,237,620 | 8/1993 | Deaton et al. | 382/7 |
| 5,243,655 | 9/1993 | Wang | 380/51 |
| 5,247,160 | 9/1993 | Zicker | 235/380 |
| 5,259,025 | 11/1993 | Monroe et al. | 380/23 |
| 5,334,823 | 8/1994 | Noblet et al. | 235/380 |
| 5,337,358 | 8/1994 | Axelrod et al. | 380/23 |
| 5,337,361 | 8/1994 | Wang et al. | 380/51 |
| 5,341,428 | 8/1994 | Schatz | 380/23 |
| 5,469,506 | 11/1995 | Berson et al. | 380/23 |

*Primary Examiner*—Salvatore Cangialosi
*Attorney, Agent, or Firm*—Robert H. Whisker; Melvin J. Scolnick; Robert Meyer

[57] ABSTRACT

An identification card and method and apparatus for producing and authenticating such an identification card. A person whom the identification card will identify, is scanned to produce a digital signal which is compressed, encrypted, and coded as a two dimensional barcode or as some other appropriate form of coding, which is incorporated into one portion of the identification card. The image is also printed or otherwise embodied onto another portion of the identification card. A text message maybe appended to the signal before it is encrypted and also printed as plain text on the identification card. In one embodiment the signal representing the image is encrypted using a public key encryption system and the key is downloaded from a center. To validate the card the coded message is scanned, decoded, decrypted, expanded and displayed. The card may then be authenticated by comparison of the displayed representation of the image and the displayed text message with the image and text message with the image and text message printed on the card. A secure record of the verification transaction is made. In one embodiment the record is electronically notarized.

18 Claims, 2 Drawing Sheets

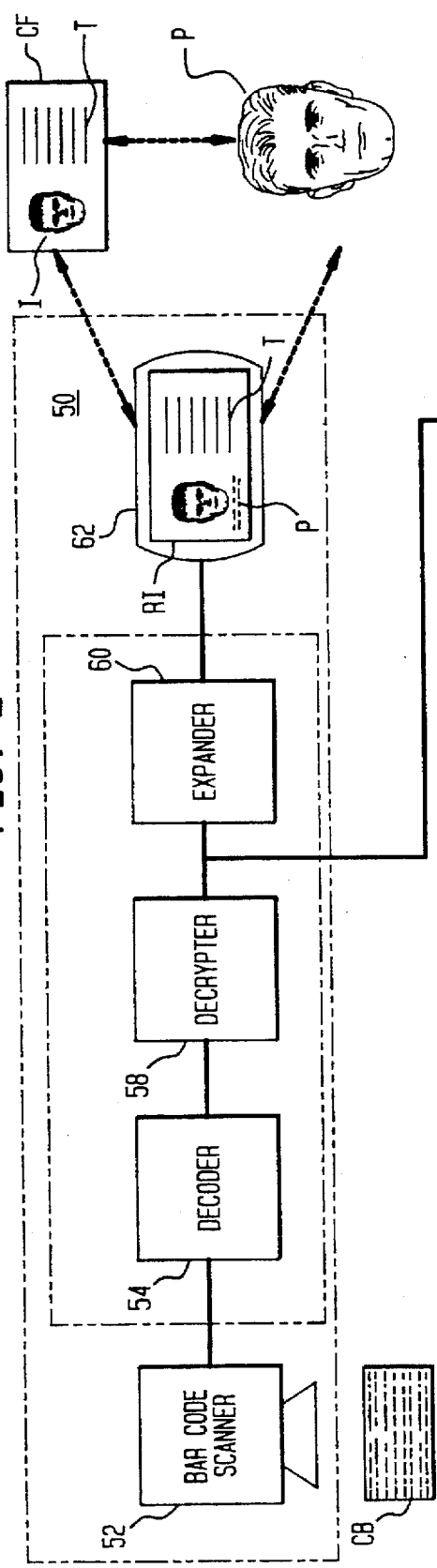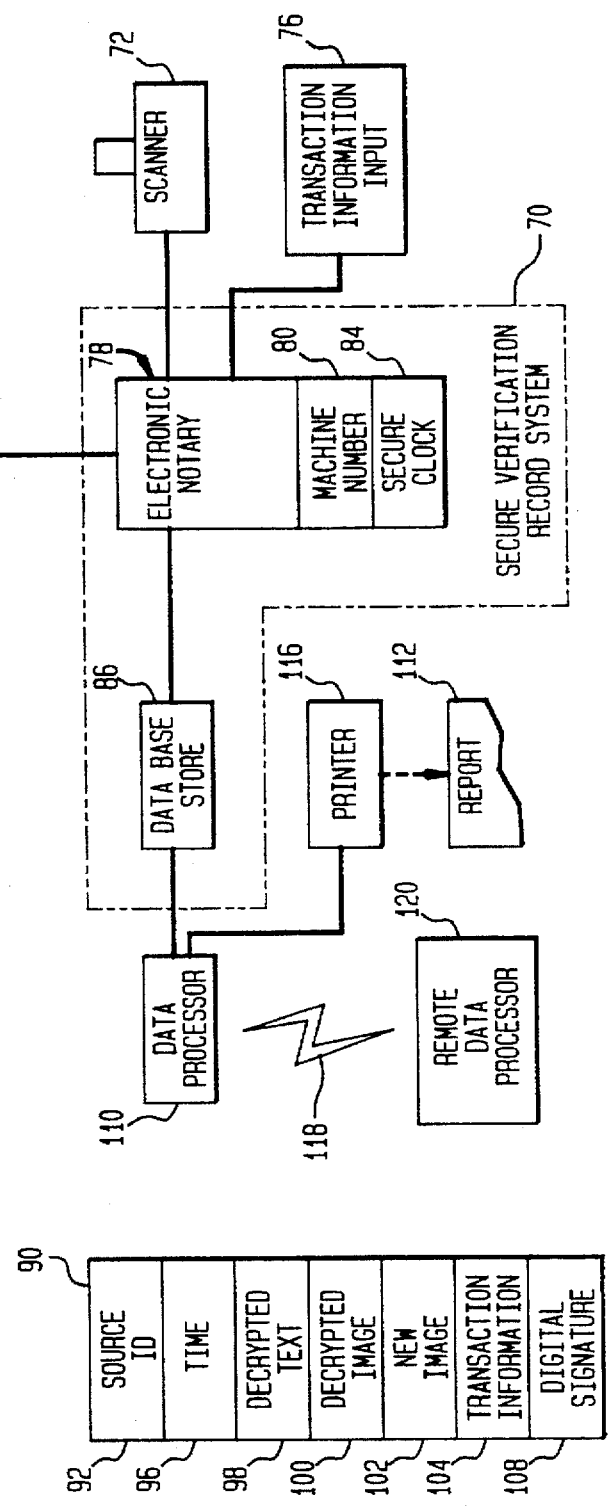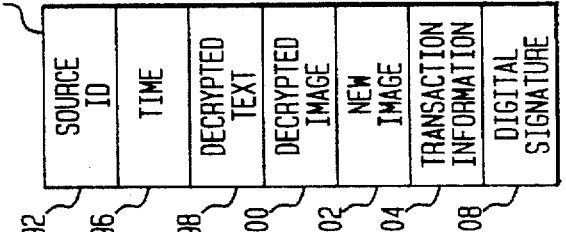

5,742,685

METHOD FOR VERIFYING AN IDENTIFICATION CARD AND RECORDING VERIFICATION OF SAME

BACKGROUND OF THE INVENTION

The subject invention relates to a method for verifying the authenticity of an identification card or similar item which serves as evidence of the identity of a person. More particularly, it relates to verification of identification cards which are protected against counterfeiting or misuse by the incorporation of encrypted information on the card. The subject invention further relates to a method of verification which also provides for the recording of verification transactions. (As used herein the term "identification card" will preferably refer to an item similar to an identification badge of the type used by businesses to identify their employees, but shall also include documents, magnetic disks, or other suitable items which can be used to record information about and identify a person.)

It is known to authenticate documents by including in the document information in two forms; a "clear" form which is generally recognizable and an encrypted form which can only be produced with knowledge of a particular encryption key. Thus, U.S. Pat. No. 4,853,961; for: "Reliable Document Authentication System"; to: Pastor; issued Aug. 1, 1959, discloses a system wherein a document is authenticated by encryption using a public key encryption system, and U.S. Pat. No. 4,637,051; to: Clark, discloses a postage meter having an indicia which is authenticated by encryption. A particular application of such technology to identification cards is disclosed in U.S. Pat. No. 5, 426,700; to: Berson; for: Method and Apparatus For Verification Of Classes of Documents; issued Jun. 20, 1995, and in commonly assigned, co-pending U.S. application Ser. No. 07/979,018; to: Marcus; filed: Nov. 20, 1992; which are hereby incorporated by reference.

While such identification cards are highly effective against counterfeiting there nevertheless remains a need in certain applications to maintain a secure record of verification transactions. For example, most states have laws to prevent the sale of liquor to minors. Penalties for violations range from 3 days to a week's suspension of a liquor license, for a first offense, and are expected to be made more severe in the future. At present however, even if a bar or liquor store owner properly checks identification (typically a driver license) he or she will generally have no way to prove that they did proper verify the identification. This problem is severe enough that some companies offer a video based archival system which records the image of the license and of the customer presenting the license. If a dispute arises the video recording can be screened to find evidence of the verification transaction. There are, however, several problems with these systems:

- Large amounts of video tape must be maintained; perhaps hundreds of hours for a large chain.
- When a dispute arises the video tapes must be viewed serially since no indexing can be provided.
- The information on the video tapes is not accessible by data processing systems.
- Often the license information is not legible.

Similarly, in controlling access to high security areas it may be desirable to not only verify the identity of people being allowed access, but also to securely record the history of access to the secure area.

Also it would be desirable to record verification transactions together with other transaction information such as: point of sale information describing items purchased, or the reasons given for seeking access to a secure area.

It would also be desirable to record verification transactions in a manner such that they may be selectively accessed; for example to generate specialized mailings to customers of a liquor store.

Thus it is an object of the subject invention to provide a method for verifying an identification card which includes encrypted information and to record such verification transactions in an accessible manner.

BRIEF SUMMARY OF THE INVENTION

The above object is achieved and the disadvantages of the prior art are overcome in accordance with the subject invention by means of a method for verifying an identification card and recording verification of the card, where the card includes information on a first portion of the card, the information including personal information relating to the person to be identified, and an encrypted representation of at least part of the information on a second portion of the card, the part including the personal information. In accordance with the method of the subject invention the encrypted information is read from the card and then decrypted to obtain a decrypted representation. The card is then verified by comparing the decrypted representation of the information with the information on the first portion of the card and the personal information is stored as at least part of a record of the verification transaction.

In accordance with one aspect of the subject invention the identification card has a first representation of a biometric characteristic of the person to be identified on the first portion and a coded representation of an encrypted signal incorporated on the second portion. The encrypted signal has a first part which includes a second representation of the biometric characteristic and a second part which includes other information about the person; which other information is stored as at least part of a record of the verification transaction.

In accordance with another aspect of the subject invention the biometric characteristic is an image of the person and the second representation is a compressed representation of the image.

In accordance with another aspect of the subject invention other transaction information is appended to the record of verification.

In accordance with still another aspect of the subject invention the record of verification is stored in a database and the database is accessed to selectively retrieve the record of verification.

In accordance with still another aspect of the subject invention time or source data is appended to the record of verification.

In accordance with yet another aspect of the subject invention the record of verification is digitally signed.

In accordance with still yet another aspect of the subject invention the record of verification is electronically notarized. Thus it will be readily apparent that the subject invention achieves the above object and overcomes the disadvantages of the prior art in a highly advantageous manner. Other objects and advantages of the subject invention will be apparent to those skilled in the art from consideration of the detailed description set forth below and the attached drawings.

BRIEF DESCRIPTION OF THE DRAWINGS

FIG. 2 is a schematic block diagram of an apparatus for verifying an identification card and recording verification of the card in accordance with the subject invention.

FIG. 3 is a schematic representation of a record of verification in accordance with the subject invention.

DETAILED DESCRIPTION OF PREFERRED EMBODIMENTS OF THE SUBJECT INVENTION

Figure 1:
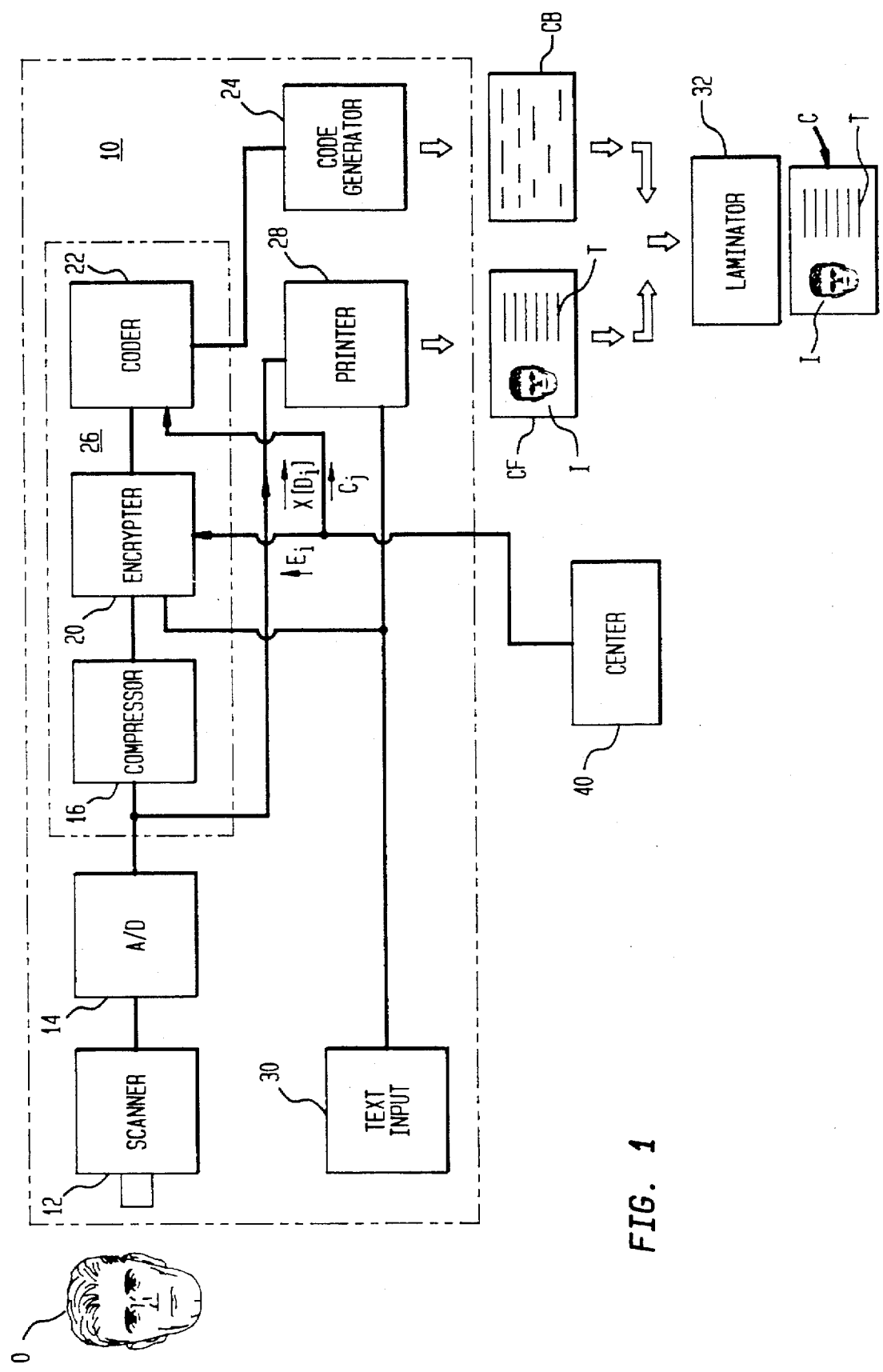
FIG. 1 is a schematic block diagram of an apparatus for producing an identification card to be verified in accordance with the subject invention.

FIG. 1 shows a schematic block diagram of apparatus 10 for producing an identification card C. Person P, for whom the identification card is intended, is scanned by a conventional video scanner 12 to produce a first signal representative of that person's image. The first signal is then converted to a digital form by an analog-to-digital converter 14 for processing in the digital domain.

The first signal is then input to a compression module 16 where it is compressed to reduce the amount of data which must be stored on identification card C.

Data compression algorithms, specifically adapted for compression of video image signals, are known to those skilled in the art. Preferably, an algorithm known as the JPEG algorithm, which is known and commercially available is used in compressor 16. Further description of the operation of compressor 16 is not believed necessary to an understanding of the subject invention.

The compressed first signal is then input to an encrypter 20 to be included in the encrypted second signal which will be incorporated into identification card C, as will be described further below. Encrypter 20 encrypts the second signal using an encryption key, $E_i$, for a public key encryption system such as the well known RSA system.

The encrypted second signal is then encoded in accordance with some predetermined format by coder module 22, which controls code generator 24 to incorporate the encoded encrypted second signal in a portion of identification card C.

In accordance with a preferred embodiment of the subject invention the coded signal is coded as a two dimensional barcode, such as the PDF-417 standard barcode, developed by the Symbol Technology Corporation of New York. However, the encrypted second signal may be coded into any suitable format. For example, for a smart card or a memory card coder 22 and code generator 24 may store the coded second signal as an appropriately formatted binary data block.

Where the coded second signal is represented as a two dimensional barcode the barcode will preferably be printed on back CB of identification card C.

The digitized first signal is also input to printer 20 which may use any appropriate technology for the production of identification card C to print an image of person P on front CF of identification card C. Front CF and back CB are then combined and laminated using well known technology by laminator 32 to product identification card C.

Text input 30 provides text message T and at least a portion of text message T, which preferably includes other personal information such as name, address, license number, etc. relating to person P, is combined with the compressed form of the first signal to form the second signal which is encrypted by encrypter module 20 to provide encrypted information $E_i[M]$. Text message T is also printed as plain text on the front CF of card C. Alternatively, text T may be compressed; as for example by deletion of control characters, which are restored in accordance with a predetermined format when text T is recovered, before text T is incorporated into the second signal. Thus, like image I text T is embodied in card C in both humanly recognizable form on the front CF and coded and encrypted form on the back CB of card C. In a preferred embodiment of the subject invention a data center 40 transmits encryption code $E_i$ to encrypter module 20. In order to increase the security of identification card C key $E_i$ may be changed from time to time. For the highest level of security key $E_i$ may be changed for each card C produced. To facilitate decryption of encrypted information $E_i[M]$ data center 40 also transmits an encrypted decryption key $X[D_i]$ to be appended to the encrypted information $E_i[M]$ by coder module 22. Encryption key X can be either a class encryption key CE for a particular class of documents produced by apparatus 10, or, in other embodiments of the subject invention may be a group encryption key GE for a group of classes of documents, or in still other embodiments of the subject invention decryption key $D_i$ can be encrypted with both a class encryption key CE and one or more group encryption keys GE. Additionally, an unencrypted representation of the particular class $C_j$ is also appended to the encrypted information $E_i[M]$ by coder module 22. Thus, as will be seen below, when card C is to be verified the necessary decryption key $D_i$ can be obtained by decrypting encrypted decryption key $X[D_i]$.

Turning now to FIG. 2 apparatus 50 for validating an identification card C is shown. The back CB of card C is scanned by a barcode scanner 52 having the capability to scan an appropriate two dimensional barcode. The scanned signal is then decoded by decoder module 54 and decrypted by decrypter module 58.

Key X (or keys) is obtained by decrypter 58 from center 40. Typically, key X will remain constant during operation of system 50, as described above, and a direct communication link between system 50 and center 40 is not necessary and key X may be transmitted in any convenient manner.

The decrypted scan signal is then expanded in module 60 by an algorithm complimentary to the compression algorithm used in system 10, in a conventional manner which need not be described further for an understanding of the subject invention.

The decrypted, expanded signal is then displayed by a conventional display 62. The display includes a representation RI of image I and the text message T which was included in the encrypted second signal scanned from card back CB. To verify the card image I is compared with its representation RI and the text message T as printed on card C and as shown on display 62 are compared. It should be noted that with compression representation RI will be somewhat degraded with respect to image I. It has been found however that using the above described JPEG algorithm a sufficiently accurate representation of an image of a person's face may be coded as approximately 1,000 bytes of data and printed using the above described PDF-417 two dimensional barcode in an area of approximately 2.50 by 1.75 inches on the back of a substantially conventional wallet sized card. Of course, as described above, with improvements in storage technology and/or the use of media having a high data storage capacity as embodiments of identification cards C representation RI can be arbitrarily close to image I.

Once card C is validated by comparison of image I and text message T printed on card from CF with representation RI and the text message T as shown on display 62 then the identify of the person P carrying card C may be confirmed by comparison of person P with image I. Text message T will then confirm the identity of person P and may also confirm the status or characteristics of person P.

It should be noted that encryption is used with identification card C not for purposes of concealment, since information M is included on Card C in clear form, but for the purpose of verifying card C. Those skilled in the art will thus recognize that rather than encrypting all of information M the equivalent process of digitally signing information caw be used. Digital signatures are well known as a means of authenticating messages without encrypting the entire message. A portion of the message is selected using any of a number of known "hash functions" and encrypted. The encrypted "hash" is then appended to the message as a digital signature. The message may then be verified by decrypting the digital signature and comparing it to the "hash" or by regenerating the digital signature from the message and comparing it to the appended digital signature. Accordingly, the terms "encrypting" and "decrypting" (and related forms of these terms) are intended, as used herein, to include the corresponding functions of generating and verifying digital signatures. It will apparent that the architecture of apparatus 10 and 50 remains unchanged with the only difference in operation being that display 62 must now display an express indication that the digital signature has been verified since image RI and text T are displayed without decryption.

Returning to FIG. 2 a secure record of a verification transaction is provided in accordance with the subject invention by transmitting at least a portion of information M to secure verification record system 70. This portion will include at least part of decrypted text T describing personal information relating to person P, and in some embodiments will include the decrypted image of person P. In other embodiments the record of verification will also include a new image generating by scanner 72 and transaction information input through input 76. In some applications transaction information can be point of sale information while in other applications, such as access control, the transaction information can include explanations of the transaction. Generally, the transaction information will also include a record of whether or not verification was successful.

Record system 70 includes electronic notary 78, which in turn includes a source identification such as machine number 80 and a secure, tamper proof clock 84. Electronic notary 78 combines the portion of information M received from decrypter 58 with the new image from scanner 72 and transaction information from input 76 to generate a secure record of the verification transaction, as will be described further below. This record is then stored in database store 86 in a conventional manner.

Turning to FIG. 3, secure verification transaction record 90 is shown. Record 90 includes source identification 92, which is preferably machine number 80 or similar identification of the source of the record, and time 96, which is preferably provided by secure clock 84 so that the system operator or a third party cannot falsify the time at which the verification transaction took place. Record 90 also includes decrypted text 98 which includes at least personal information relating to person P whose identify is being verified. In a preferred embodiment of the subject invention record 90 also includes decrypted image 100 from decrypter 58 and new image 102 from scanner 72 and transaction information 104 from input 76. Record 90 is then electronically notarized by appending digital signature 108 in a conventional manner. Generally, electronic notarization includes appending secure time information to a message and then digitally signing the message to provide assurance that the message was recorded at that particular time. Such electronic notarization is known and is described in U.S. patent number in U.S. Pat. No. 5,022,080; to: Durst et al.; issued: Jun. 4, 1991, which is hereby incorporated by reference. Other methods (such as digitally signing a document to which information derived from previous documents in a stream of documents has been appended so that the position of the document in the stream of documents is established) for securely establishing the time of recording and content of a message are known and are included within the meaning of the term "electronic notary" as used herein.

In another preferred embodiment of the subject invention data processor 110 accesses database store 86, using conventional database access the techniques, to generate various reports of verification transactions. For example in a liquor store application data processor 110 might generate specialized customer mailings. Or reports 112 of access by particular persons or during particular time periods can be printed by printer 116 to provide an audit trail of verification activity.

In another embodiment of the subject invention link 118, which may be any suitable communications link, connects data processor 110 to remote data processor 120 to download data for remote processing.

The preferred embodiments described above have been given by way of example only, and other embodiments of the subject invention will be apparent to those skilled in the art from consideration of the detailed descriptions set forth above and the attached drawings. Particularly, it will be apparent that card C need not include any biometric characteristic but that a degree of security can be achieved using only encrypted text information on card C. Accordingly, limitations on the subject invention are to be found only in the claims set forth below.

What is claimed is:

1. A method for verifying an identification card and recording verification of said card, said card having a first representation of a biometric characteristic of a person to be identified on a first portion and a coded representation of an encrypted signal incorporated on a second portion of said card, said encrypted signal having a first part comprising a second representation of said biometric characteristic and a second part comprising other information about said person, said method comprising the steps of:
   a) reading said coded representation from said card;
   b) decoding said coded representation to obtain a decoded representation;
   c) decrypting said decoded representation to obtain said second representation of said biometric characteristic and said other information;
   d) verifying said card by comparing said first and second representations of said biometric characteristic;
   e) creating a record of verification of said card, said record including said other information; and
   f) digitally signing said record and then storing said record.

2. A method as described in claim 1 wherein said biometric characteristic is an image of said person and said second representation is a compressed representation of said image.

3. A method as described in claim 1 further comprising the steps of:
   a) scanning said person to obtain a representation of a new image of said person; and,
   b) storing said representation of said new image as a further part of said record of verification.

4. A method as described in claim 1 further comprising the step of storing said second representation of said biometric characteristic as a further part of said record of verification.

5. A method as described in claim 1 further comprising the step of appending transaction information to said record of verification.

6. A method as described in claim 1, wherein said record of verification is stored in a database, further comprising the step of accessing said database to selectively retrieve said record of verification.

7. A method as described in claim 1 further comprising the step of appending time or source data to said record of verification.

8. A method as described in claim 1 wherein said record of verification is electronically notarized.

9. A method as described in claim 1 further comprising the step of generating an audit trail of verification activity, said audit trail including at least part of said record of verification.

10. A method as described in claim 1 further comprising the step of downloading at least part of said record of verification to a remote data processing system.

11. A method for verifying an identification card and recording verification of said card, said card having information on a first portion, said information including personal information relating to a person to be identified, and an encrypted representation of at least a part of said information on a second portion, said part including said personal information, said method comprising the steps of:

a) reading said encrypted representation from said card;
  b) decrypting said encrypted representation to obtain a decrypted representation;
  c) verifying said card by comparing said decrypted representation with said information; and
  d) creating a record of verification of said card, said record including said personal information; and
  e) digitally signing said record and then a storing said record.

12. A method as described in claim 11 further comprising the steps of:

a) scanning said person to obtain a representation of an image of said person; and,
  b) storing said representation of said image as a further part of said record of verification.

13. A method as described in claim 11 further comprising the step of appending transaction information to said record of verification.

14. A method as described in claim 11, wherein said record of verification is stored in a database, further comprising the step of accessing said database to selectively retrieve said record of verification.

15. A method as described in claim 11 further comprising the step of appending time or source data to said record of verification.

16. A method as described in claim 11 wherein said record of verification is electronically notarized.

17. A method as described in claim 11 further comprising the step of generating an audit trail of verification activity, said audit trail including at least part of said record of verification.

18. A method as described in claim 11 further comprising the step of downloading at least part of said record of verification to a remote data processing system.

* * * * *